United States Patent [19]
Wang et al.

[11] Patent Number: 5,895,864
[45] Date of Patent: Apr. 20, 1999

[54] MAGNETIC FLOWMETER WITH EMPTY TUBE DETECTION

[75] Inventors: Shiquan Wang, Northboro; Peter B. Lewis, North Attleboro; Norman O. Fonteneau, Acushnet, all of Mass.; Vincent W. Devore, Farmington, Me.

[73] Assignee: The Foxboro Company, Foxboro, Mass.

[21] Appl. No.: 08/580,509

[22] Filed: Dec. 28, 1995

[51] Int. Cl.$^6$ ........................................ G01F 1/58
[52] U.S. Cl. ................................................ 73/861.12
[58] Field of Search ...................... 73/861.15, 861.12, 73/861.17, 861.16

[56] References Cited

U.S. PATENT DOCUMENTS

| | | | |
|---|---|---|---|
| 3,991,612 | 11/1976 | Mannherz et al. | 73/194 EM |
| 4,036,052 | 7/1977 | Searle | 73/194 EM |
| 4,503,711 | 3/1985 | Bohn | 73/861.12 |
| 5,301,556 | 4/1994 | Nissen et al. | 73/861.16 |
| 5,327,787 | 7/1994 | Kiene et al. | 73/861.12 |
| 5,375,475 | 12/1994 | Kiene et al. | 73/861.15 |
| 5,426,984 | 6/1995 | Rovner et al. | 73/861.12 |

FOREIGN PATENT DOCUMENTS

WO 95/06857  3/1995  WIPO ................ G01F 1/60

OTHER PUBLICATIONS

Fischer & Porter Company, Magnetic Flowmeters 50XM1000B, Publication 24296, Figure 3–18, Schematic Analog Board, Jan. 1990.

*Primary Examiner*—Richard Chilcot
*Assistant Examiner*—Jewel Artis
*Attorney, Agent, or Firm*—Fish & Richardson P.C.

[57] ABSTRACT

A magnetic flowmeter has a tube for supporting fluid flow and a circuit for indicating when the tube is empty. The circuit includes an amplifier connected to two electrodes in the tube and a variable resistor. The amplifier produces an oscillating signal when the tube is empty.

The circuit is calibrated for a particular fluid by finding a range of resistances for the variable resistor at which the circuit provides an accurate indication that the tube is empty, and storing information in the processor indicating a resistance in the range for the fluid.

16 Claims, 4 Drawing Sheets

MAGNETIC FLOWMETER WITH EMPTY TUBE DETECTION

BACKGROUND OF THE INVENTION

This invention relates to magnetic flowmeters with empty tube detection circuitry.

Magnetic flowmeters measure the rate of flow of a process fluid through a tube. Magnetic coils mounted on opposite sides of the tube produce a magnetic field perpendicular to the direction of fluid flow in the tube. Electrodes placed in the tube measure a resulting current in the fluid that is perpendicular to both the direction of fluid flow and the magnetic field. A processor converts the output of the electrodes to a measure of the rate of fluid flow.

Some magnetic flowmeters are equipped with a circuit that detects the presence of fluid in the tube and prevents the flowmeter from measuring a non-zero flow rate when the tube is empty. One such circuit, manufactured by Fischer and Porter, produces an oscillating signal to indicate that the tube is full. The oscillating signal disappears when the tube is empty.

SUMMARY OF THE INVENTION

In general, the invention features a magnetic flowmeter with a circuit that produces an oscillating signal when the flowmeter tube is empty. The circuit receives the output of two electrodes mounted in the tube.

Preferred embodiments of the invention include the following features.

The circuit comprises an amplifier with a non-inverting input that receives an output of each electrode and an output of a variable resistor. The variable resistor and other resistors may be arranged to provide a fixed negative feedback path and a variable positive feedback path to the amplifier.

The variable resistor is set to a resistance causing the output of the amplifier to oscillate when the tube is empty and causing the output of the amplifier to not oscillate when an electrode is at least partially immersed in fluid. The calibration may be based on the conductivity of the fluid.

The circuit may also include a rectifier connected to the output of the circuit and a processor providing an indication that the tube is empty based on the output of the circuit. The indication may include a digital signal.

The circuit is not limited for use with magnetic flowmeters, but may be employed with any tube that carries fluid.

In general, in another aspect, the invention features a method for calibrating an empty tube detection circuit for a flowmeter, of the type described above. The method includes finding a range of resistances of the variable resistor at which the circuit provides an accurate indication that the tube is empty, and storing information in the processor specifying a resistance in the range for a particular fluid.

Preferred embodiments of this aspect of the invention include the following features.

An identifier for the fluid and a resistance in the range are stored in a lookup table. A user sets up the circuit for a particular fluid by specifying the fluid to the processor. The processor sets the variable resistor to the stored resistance for the fluid.

Alternatively, a characteristic of the particular fluid is measured, and the characteristic and a resistance in the range are stored. The characteristic includes a resistance of the variable resistor below which the circuit erroneously indicates an empty tube condition. A user sets up the circuit by filling the tube with fluid and causing the processor to measure the characteristic of the fluid. The processor then sets the variable resistor to the stored resistance for the characteristic.

In some embodiments, characteristics for several different fluids are measured, and a relation between the characteristics and a resistance in the range is stored.

Advantages of the invention include the following features.

The circuit accurately indicates that the tube is empty over a large range of process fluid conductivities. An empty tube signal from the circuit causes the processor to zero the flow rate, preventing any erroneous flow measurements from being displayed to the user.

This is accomplished without providing an alarm indicating to the user that the tube is empty and that any displayed flow measurements may be erroneous. The flowmeter thus does not require a system for disabling the alarm when the user already knows that the tube is empty, or simply does not need to be alerted to the tube's empty condition.

Because both electrodes must be uncovered before an empty tube is indicated, the presence of an air bubble at one electrode does not produce a false empty tube signal.

Rectifying the output of the circuit requires the processor only to distinguish a low signal from a high signal in determining whether the tube is empty. This takes less processor time than identifying a particular frequency output from the amplifier, and prevents errors when this frequency is low. The capacitors in the rectifier also absorb some noise from the system and decrease the likelihood of errors.

The flowmeter circuitry is easily calibrated at the factory for a range of fluids with differing conductivities. As a result, an end user need only select a flowmeter appropriate for his particular process fluid, without specifying the conductivity of the fluid. The user prepares the flowmeter for use by simply activating a calibration feature on the flowmeter when the tube is full, e.g., by pushing a button on the processor. This procedure does not require the user to empty the tube after it has been filled with fluid—a procedure that is not usually performed during flow measurement. This is in marked contrast to existing schemes that require the user to perform complex calibration procedures, e.g., by filling the tube, adjusting certain readings, then emptying the tube and re-adjusting the readings.

In addition, the user can easily reactivate the calibration whenever the conductivity of the process fluid changes, or the electrodes become fouled. Alternatively, the circuit may re-calibrate itself at periodic intervals to monitor changes in the fluid and tube characteristics. This is possible because the empty tube measurement is accurately performed independently of whether there is fluid flow in the tube, or whether a flow measurement is being made. In addition, because the amplifier produces an oscillating output only when the tube is empty, the signal in no way disturbs the output of the electrodes when the tube is full. This prevents the circuit from introducing errors into the processor's flow measurements. The circuit is thus versatile and accurate under varying conditions.

The calibration performed at the factory is a simple procedure that requires finding a threshold variable resistance at which the circuit oscillates when the tube is full, and storing either a formula or a look-up table in a processor that indicates an appropriate variable resistance setting at each threshold. In addition, this calibration technique is not specific to the circuit described above, but may be performed with any circuit that provides an empty tube signal.

DESCRIPTION OF THE PREFERRED EMBODIMENTS

Figure 1:
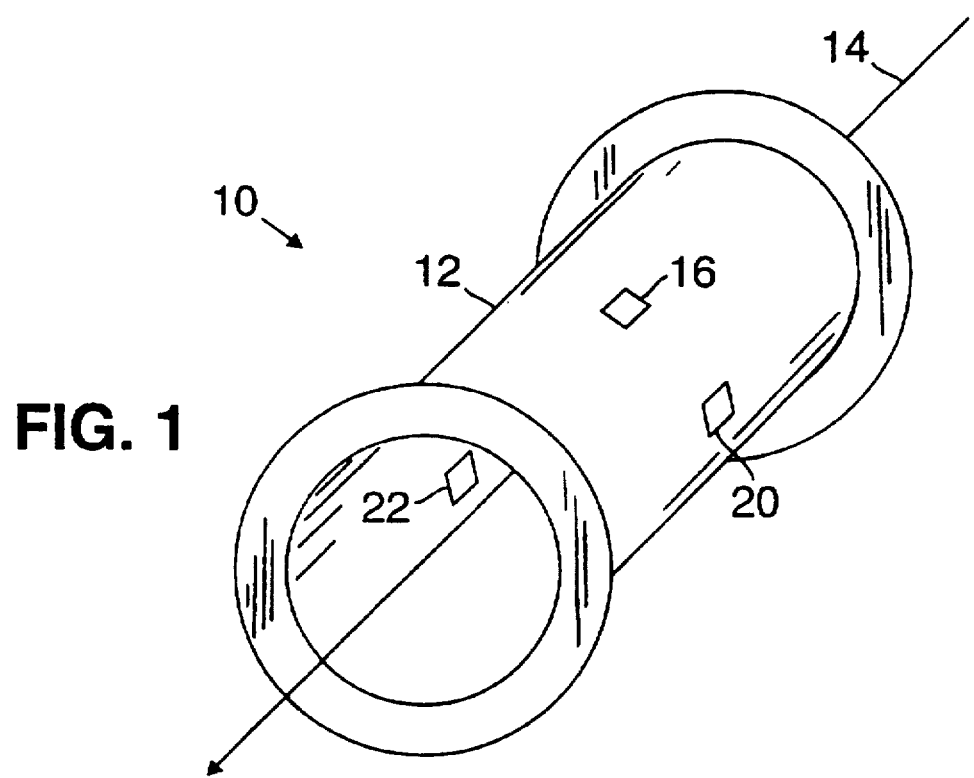
FIG. 1 is a schematic perspective view of a magnetic flowmeter.
Figure 2:
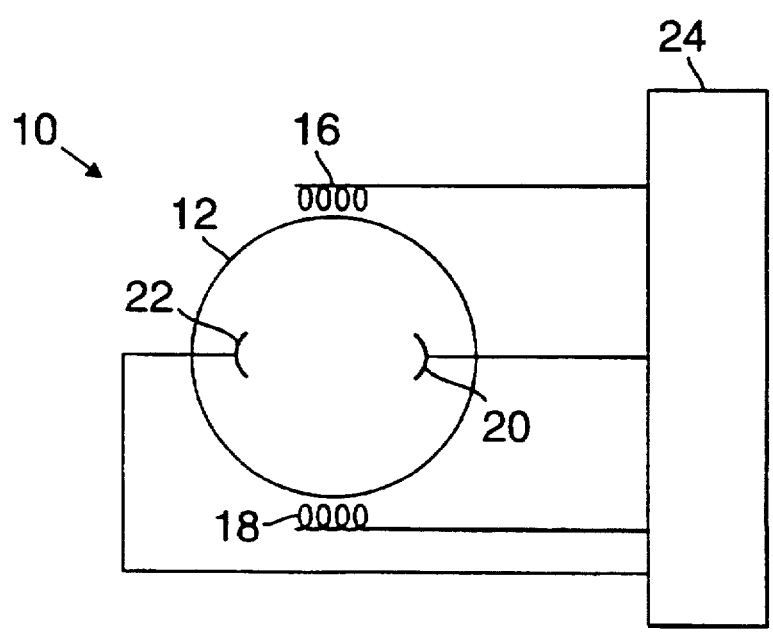
FIG. 2 is a schematic front view of the flowmeter of FIG. 1.

Referring to FIGS. 1 and 2, a magnetic flowmeter 10 has a tube 12 for supporting fluid flow along its longitudinal axis 14. A pair of magnetic coils 16, 18 mounted on opposite-sides of the tube create a magnetic field perpendicular to the axis of the tube. Electrodes 20, 22 are disposed on opposite sides of the interior of the tube, along a line perpendicular to axis 14 and the magnetic field. A surface of each electrode is in contact with the process fluid when the tube is full.

Magnetic coils 16, 18 and electrodes 20, 22 are each connected to a processor 24 that controls the current through the coils and converts the output of the electrodes to a flow rate measurement, as well as performing other functions.

Figure 3A:
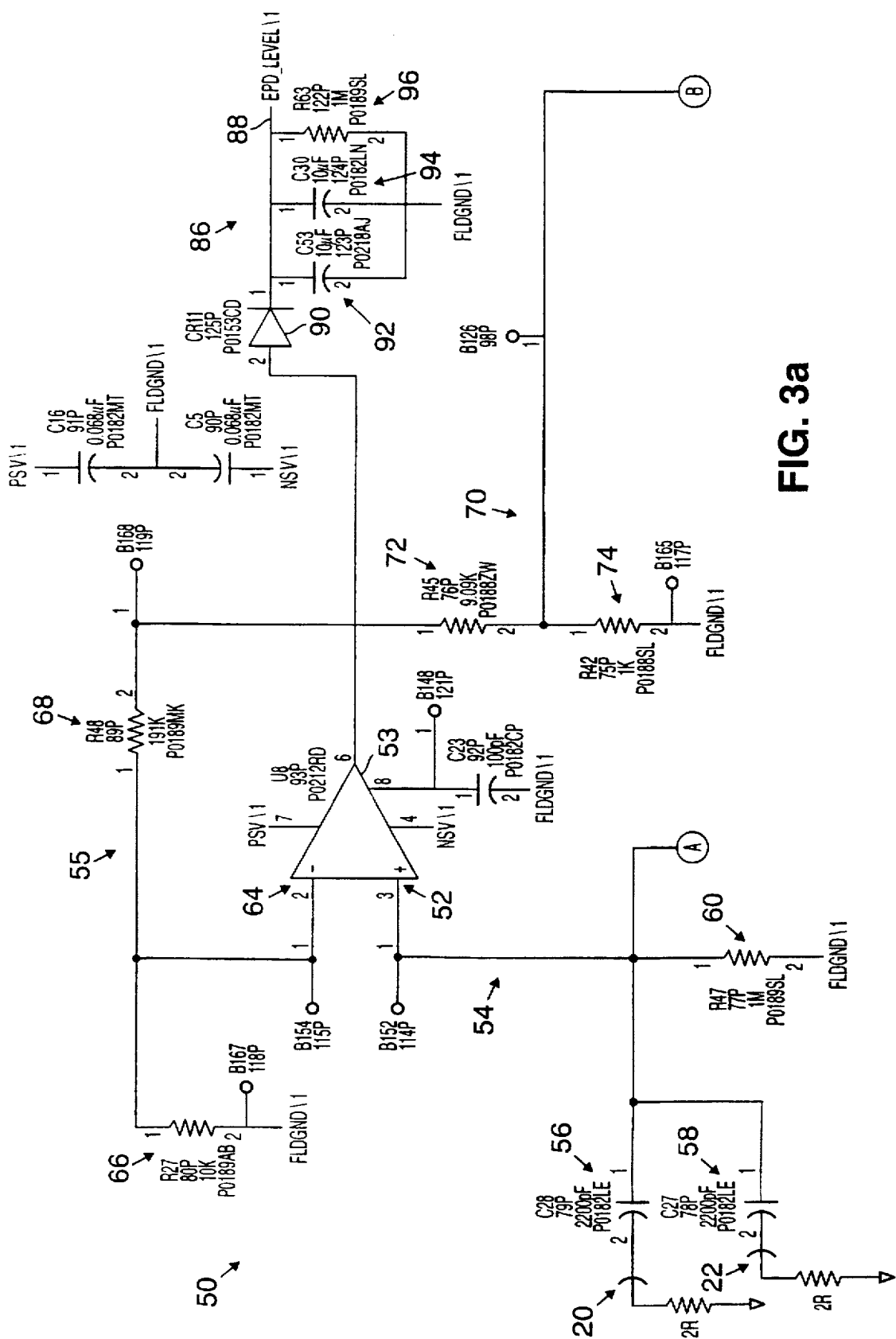
FIG. 3 is a circuit diagram of an empty tube detection circuit in the flowmeter of FIGS. 1 and 2.
Figure 3B:
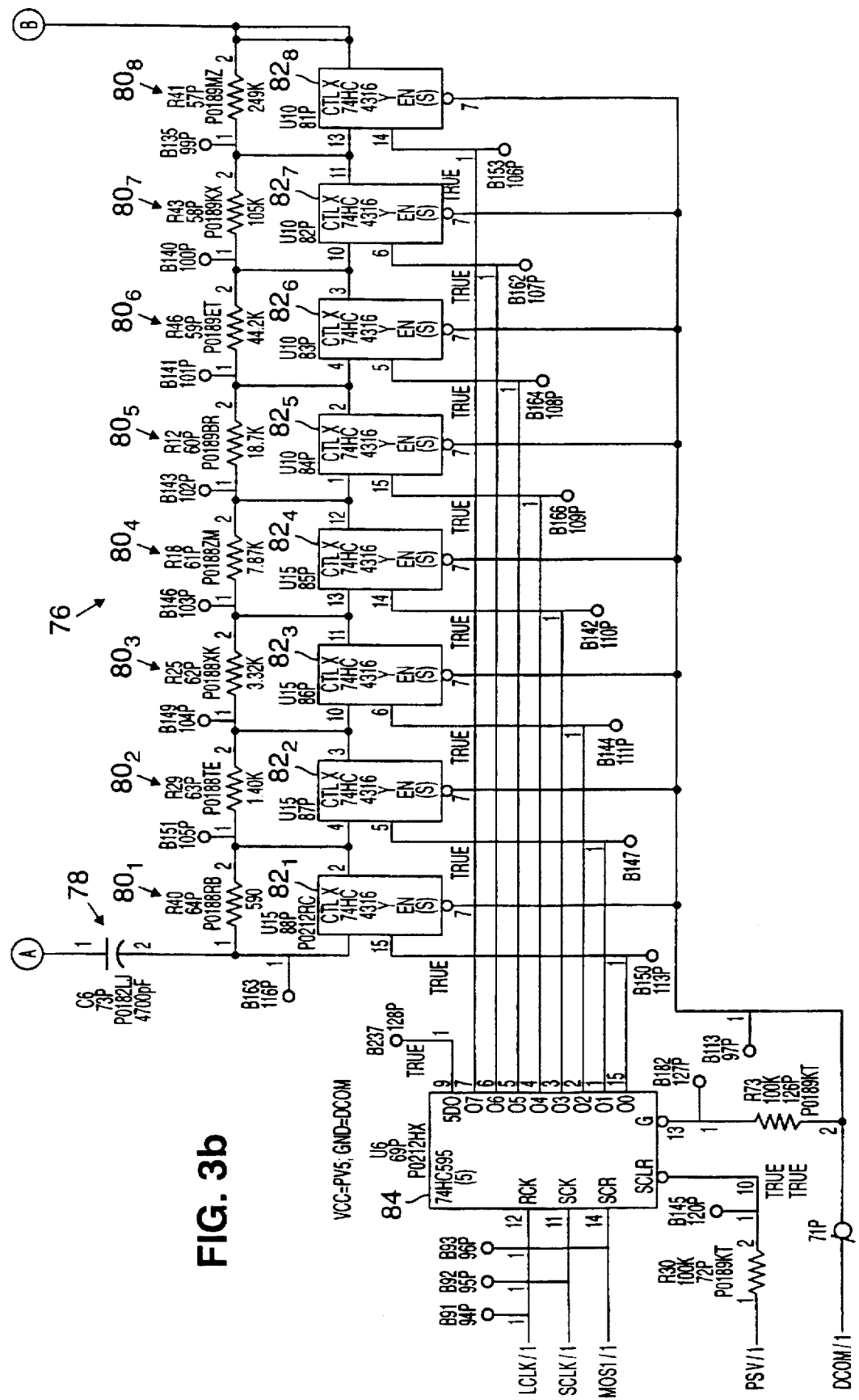

Referring to FIG. 3, processor 24 includes an empty tube detection circuit 50 connected to each electrode 20, 22. The resistance (2R) between each electrode and the tube (which is grounded) depends on the conductivity of the process fluid, the size and placement of the electrodes, and the level of impurities on the inside of the tube. The preferred embodiment of circuit 50 described below is designed for process fluid conductivities ranging from at least 1.5 to 325 µϒ/cm.

Each electrode is connected to a non-inverting input 52 of an operational amplifier 53 via a variable resistance positive feedback path 54. The amplifier also has a fixed resistance negative feedback path 55. When the tube is empty (i.e., both electrodes are completely uncovered), the resistance (2R) between the electrodes and the tube is high, and the positive feedback to the amplifier exceeds the negative feedback and the output of the amplifier oscillates. When the tube is full (i.e., one or both electrodes are at least partially immersed in fluid), and the resistance (2R) between the electrodes and the tube is relatively low, the negative feedback exceeds the positive feedback to the amplifier and the output no longer oscillates. The presence of an oscillating output thus signals to the processor that the tube is empty.

The negative feedback path includes a 10 kOhm resistor 66 connecting an inverting input 64 of the amplifier to ground. The output of the amplifier is fed back to the inverting input of the amplifier via a 191 kOhm resistor 68. The amplifier is biased by a supply voltage and capacitor 62 in a conventional manner.

The positive feedback path includes 2200 pF capacitors 56, 58 connecting each electrode to the non-inverting input of the amplifier. The capacitors prevent DC signals from coupling to the electrodes, for example, the flow measurement signal from the electrode. As a result, the electrodes act essentially as resistors, and the magnitude of the coil current and the presence or absence of fluid flow in the tube do not disturb the empty tube measurement. The outputs of the capacitors are additionally connected to a 1 MOhm resistor 60.

The output of the amplifier is fed back to the non-inverting input 52 of the amplifier via subcircuit 70. Subcircuit 70 couples the output of the amplifier to ground via a 9.09 kOhm resistor 72 connected in series to a 1 kOhm resistor 74. These resistors attenuate the output of the amplifier to prevent a large signal from being coupled back to the electrodes.

The output of resistor 72 is coupled to the non-inverting input of the amplifier by a variable resistor 76 connected in series with a 4700 pF capacitor 78. Capacitor 78 together with resistor 60 prevent a DC output of the amplifier from coupling back to the non-inverting input. The amplifier is thus stable at DC.

Variable resistor 76 includes eight resistors $80_1, \ldots, 80_8$ connected in series and having varying resistances. For example, in the embodiment shown, resistors $80_1$ to $80_8$ have values of 0.590, 1.40, 3.32, 7.87, 18.7, 44.2, 105 and 249 kOhm, respectively.

Each resistor $80_1, \ldots, 80_8$ is connected in parallel to a switch $82_1, \ldots, 82_8$ coupled to a multiplexer 84. Multiplexer 84 receives digital signals from the processor, and varies the resistance of resistor 76 by selectively opening or closing the switches. The value of the resistance is 250 Ohms when all the switches are on, and 431 kOhms when all the switches are off. As described in more detail below, the minimum resistance of the variable resistor is lower than the resistance ($R_{min}$) at which the circuit will oscillate when the tube is full. In addition, the maximum resistance of the variable resistor exceeds the highest resistance ($R_{max}$) at which the circuit will not oscillate when empty.

The output of amplifier 53 is also connected to a rectifier 86 which provides a DC signal 88 to a CMOS inverter. The inverter provides a digital signal to the processor indicating whether the tube is full or empty. The rectifier includes a diode 90 connected in series to a 10 µF capacitor 92, 10 nF capacitor 94 and a 1 MOhm resistor 96, all connected in parallel.

In operation, the processor causes the magnetic coils 16, 18 to produce an alternating magnetic field in the tube 12 (FIG. 1). This causes electrodes 20, 22 to supply an AC signal to the amplifier. Above a threshold frequency, capacitors 56, 58, 78 act as open circuits, supplying a positive feedback to the amplifier that is proportional to $R/(R+R_S)$ (where $R_S$ is the resistance of variable resistor 76, and where the effect of resistor 60 has been ignored). When this positive feedback exceeds the negative feedback arriving at inverting input 64, the amplifier produces an oscillating output. When the positive feedback is less than the negative feedback, the output of the amplifier is a low voltage DC signal.

Figure 4:
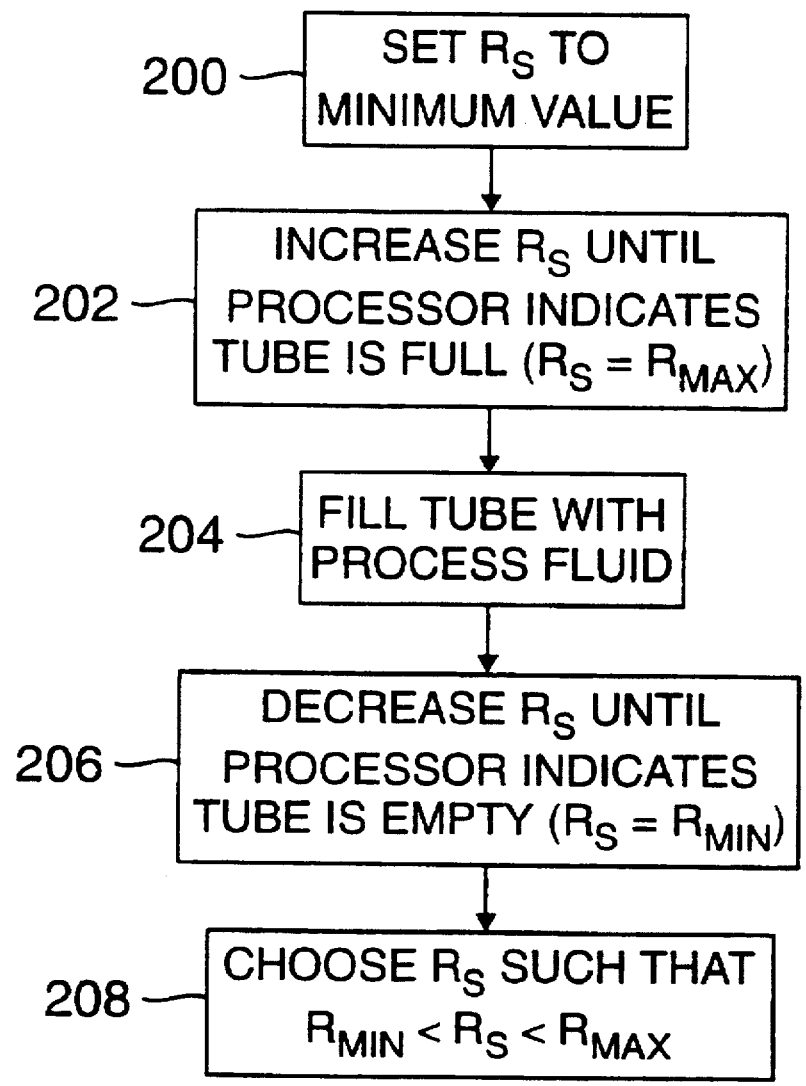
FIG. 4 is a flowchart for a calibration procedure for the flowmeter of FIGS. 1 and 2.

Before the flowmeter is shipped to an end user, a technician calibrates the flowmeter circuitry using the method shown in FIG. 4. When the tube is empty, and the resistance between the electrodes and the tube is high, the technician instructs the processor to set the variable resistance to a low value (e.g., the minimum value of 250 Ohms) (step 200). This causes the positive feedback to the amplifier to exceed the negative feedback, and the output of the amplifier oscillates. The oscillating output of the amplifier is converted to a high DC signal by the rectifier, and the inverter converts this signal to a digital logic High signal indicating to the processor that the tube is empty. This triggers the processor to interrupt the flow measurement, and indicate to the user that the tube is empty.

The technician then gradually increases the variable resistance until the positive feedback no longer exceeds the negative feedback input to the amplifier, and the output of the amplifier stops oscillating (step 202). The DC signal at the output of the rectifier is now a low signal, which the inverter converts to a logic Low signal indicating that the tube is full. To avoid this error during use, the technician must set the variable resistance at a value below this threshold resistance ($R_{max}$).

Next, the technician fills the tube with a particular process fluid, e.g., by connecting the tube to a pipeline (step 204). This causes the resistance between the electrodes and the tube to decrease (in relation to the conductivity of the fluid) and prevents the output of the amplifier from oscillating. The technician then continues his calibration by decreasing the variable resistance until the positive feedback to the amplifier exceeds the negative feedback, and the circuit resumes oscillating (step 206). To prevent an erroneous empty tube reading based on this signal, the variable resistance must be set to a value ($R_S$) that exceeds this threshold resistance ($R_{min}$) but remains below $R_{max}$ (step 208).

The technician then repeats steps 200 through 208 for another process fluid, having another fluid conductivity. He then either stores in the processor appropriate values of $R_S$ for each fluid, or he derives an equation relating $R_S$ to $R_{min}$ and stores this equation in the processor. One setting that works well for process fluid conductivities between 1.5 μʊ/cm to 325 μʊ/cm is:

$$R_S = 63 + 1.707 R_{min} \quad (1)$$

Conductivities that vary greatly from those given above may require a different formula or a variable resistor with a different range of resistances to be employed. It is sufficient to derive $R_S$ based only on $R_{min}$ since $R_{max}$ is related to $R_{min}$.

An end user then chooses a flowmeter, calibrated according to the process described above, that is appropriate for the particular process fluid the user wishes to measure. The user then sets up the flowmeter by indicating to the processor the type of fluid to be measured. If a lookup table is used, the processor matches the fluid type to its corresponding resistance $R_S$ stored in memory, and sets the variable resistance to that value.

Alternatively, if the processor stores an equation in the form of Equation (1), the user first ensures that the tube is full before activating the processor for calibration. The processor turns all switches off so that the variable resistor is at a maximum value. Because this resistance exceeds $R_{min}$, the amplifier does not oscillate and the processor indicates a full tube. The processor then gradually decreases the variable resistance until the amplifier oscillates and an empty tube signal is generated. The value of the resistance that causes the empty tube signal is set to $R_{min}$. The processor then calculates $R_S$ from $R_{min}$ based on Equation (1).

The user re-activates the calibration procedure whenever the type of process fluid changes, or when the electrodes become fouled. Alternatively, the processor automatically re-calibrates the circuit at set intervals.

Other embodiments are within the following claims.

For example, the values of various components in circuit 50 are varied to accommodate process fluids with different conductivities. Alternatively, values of capacitors 56, 58, 78 are decreased to 1500 pF to create a circuit less sensitive to low frequencies. In other embodiments, the capacitance of the capacitors exceeds 200 pF to increase the sensitivity of the amplifier.

Instead of using resistors 72, 74, the output of the amplifier can be attenuated by decreasing the supply voltages to the amplifier or limiting the amplifier's output swing with zener diodes.

Temperature correction circuits can be connected to the circuit to compensate for fluctuations in the temperature of the process fluid.

What is claimed is:

1. A magnetic flowmeter comprising:

a tube for supporting fluid flow, two electrodes mounted in the tube, a circuit receiving an output of each electrode, an output of the circuit comprising a substantially oscillating signal when the tube contains no fluid and a substantially non-oscillating signal when the tube is filled with the fluid.

2. The flowmeter of claim 1, wherein the circuit comprises an amplifier receiving an output of the electrode at a non-inverting input.

3. The flowmeter of claim 2, wherein the circuit further comprises a variable resistor connected to the non-inverting input of the amplifier.

4. The flowmeter of claim 3, wherein the variable resistor is calibrated to a resistance causing the output of the amplifier to oscillate when the tube is empty and causing the output of the amplifier to not oscillate when one electrode is at least partially covered by fluid in the tube.

5. The flowmeter of claim 1 further comprising a rectifier connected to the output of the circuit.

6. The flowmeter of claim 1 further comprising a processor for converting the oscillating signal to an indication that the tube is empty.

7. A circuit for detecting that a tube for supporting fluid flow is empty, the tube comprising two electrodes that are immersed in the fluid when the tube is full, the circuit comprising:

a device receiving an output of each electrode, a subcircuit connected to the device, the subcircuit causing an output signal of the device to substantially oscillate when the tube is empty of fluid and to substantially not oscillate when the tube is full of fluid.

8. The circuit of claim 7 wherein the device is an amplifier receiving the output of each electrode at a non-inverting input, the subcircuit comprising resistors connected to the non-inverting input and an inverting input of the amplifier.

9. The circuit of claim 8 wherein the resistors comprise a variable resistor connected to the non-inverting input of the amplifier, the variable resistor being set to cause the amplifier to produce an oscillating output when the tube is empty.

10. The circuit of claim 7, further comprising a rectifier connected to the output of the device.

11. A method for detecting when a tube is empty of fluid, comprising:

measuring an output of two electrodes normally immersed in fluid, providing the output to a device, configuring the device so that the device provides a substantially oscillating output when the tube is empty and provides a substantially non-oscillating output when the tube is full, providing an indication that the tube is empty based on the substantially oscillating output.

12. The method of claim 11 wherein the step of providing an indication comprises rectifying the oscillating signal, and determining the amplitude of the signal.

13. The method of claim 12 wherein the step of providing an indication further comprises converting the amplitude of the signal to a digital indication that the tube is empty.

14. The method of claim 11 wherein providing the output to a device comprises providing the output to an amplifier with a fixed negative feedback path and a variable positive feedback path.

15. The method of claim 14 wherein the step of configuring the device comprises adjusting the positive feedback path so that the device provides an oscillating output when the tube is empty.

16. The method of claim 11, wherein the step of configuring the device comprises configuring the device based on a conductivity of the fluid.

* * * * *